March 27, 1945.  J. FRANCOIS  2,372,319
BRAKE
Filed Jan. 10, 1942  6 Sheets-Sheet 1

INVENTOR
JEAN FRANCOIS
BY
M. W. McConkey

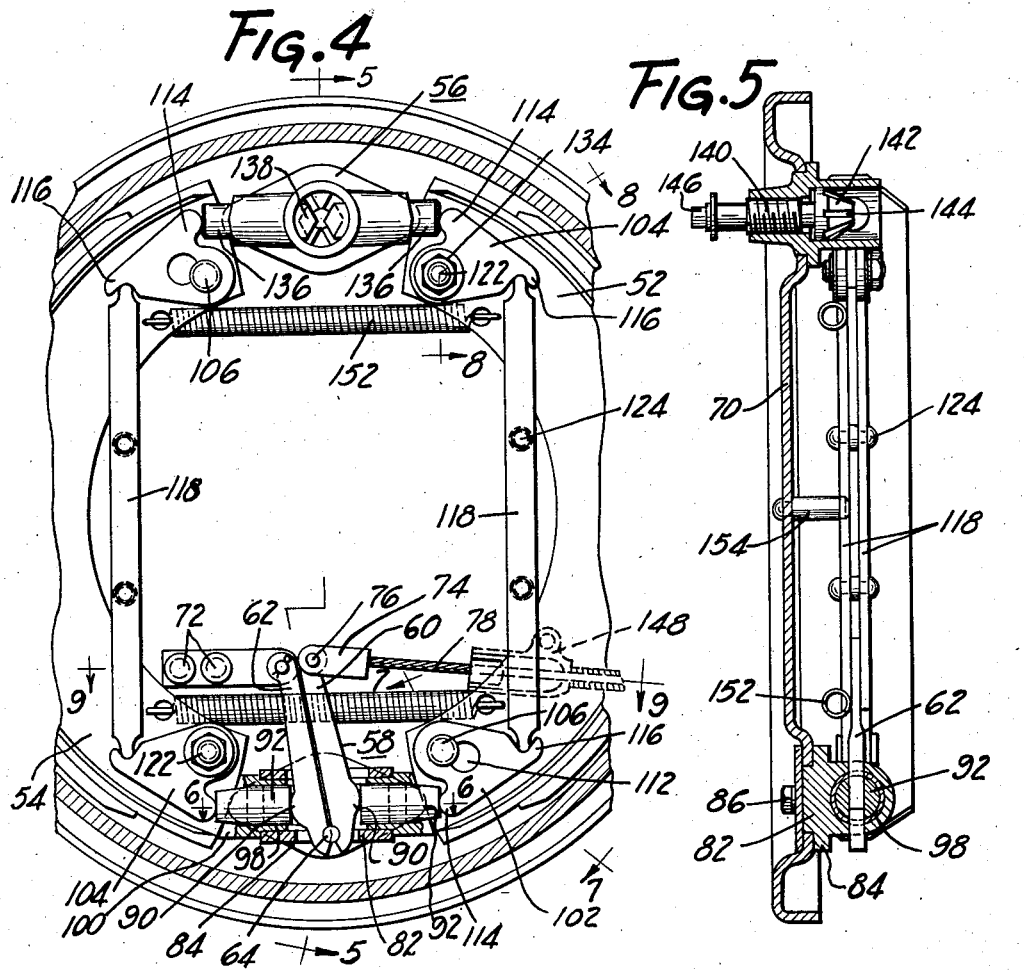

March 27, 1945.  J. FRANCOIS  2,372,319

BRAKE

Filed Jan. 10, 1942  6 Sheets-Sheet 3

INVENTOR
JEAN FRANCOIS
BY
M. W. McConkey

March 27, 1945.   J. FRANCOIS   2,372,319
BRAKE
Filed Jan. 10, 1942   6 Sheets-Sheet 4
Fig. 11
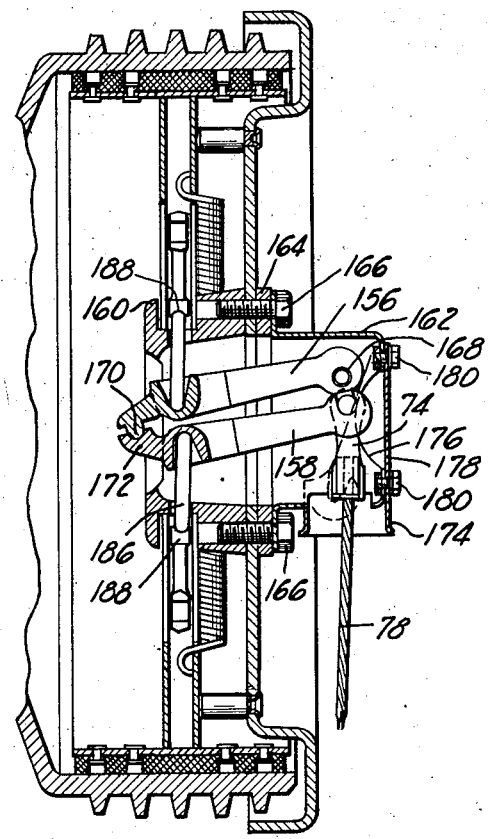
Fig. 15
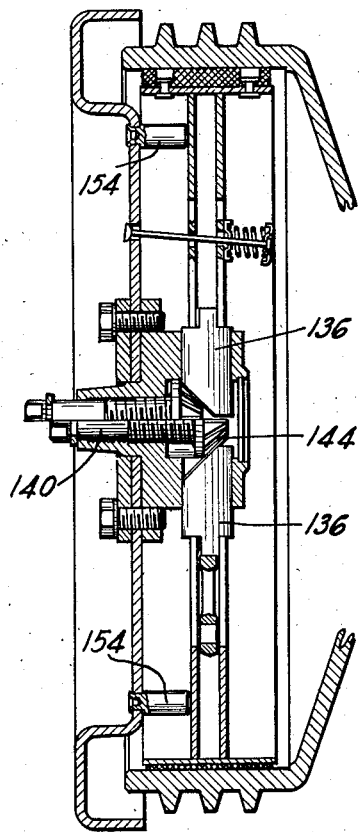
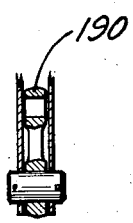
Fig. 12
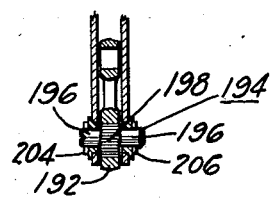
Fig. 13
INVENTOR
JEAN FRANCOIS
BY
Jn. W. McConkey March 27, 1945. J. FRANCOIS 2,372,319
BRAKE
Filed Jan. 10, 1942 6 Sheets-Sheet 5

INVENTOR
JEAN FRANCOIS
BY
M. W. McConkey

March 27, 1945.　　　J. FRANCOIS　　　2,372,319
BRAKE
Filed Jan. 10, 1942　　　6 Sheets-Sheet 6
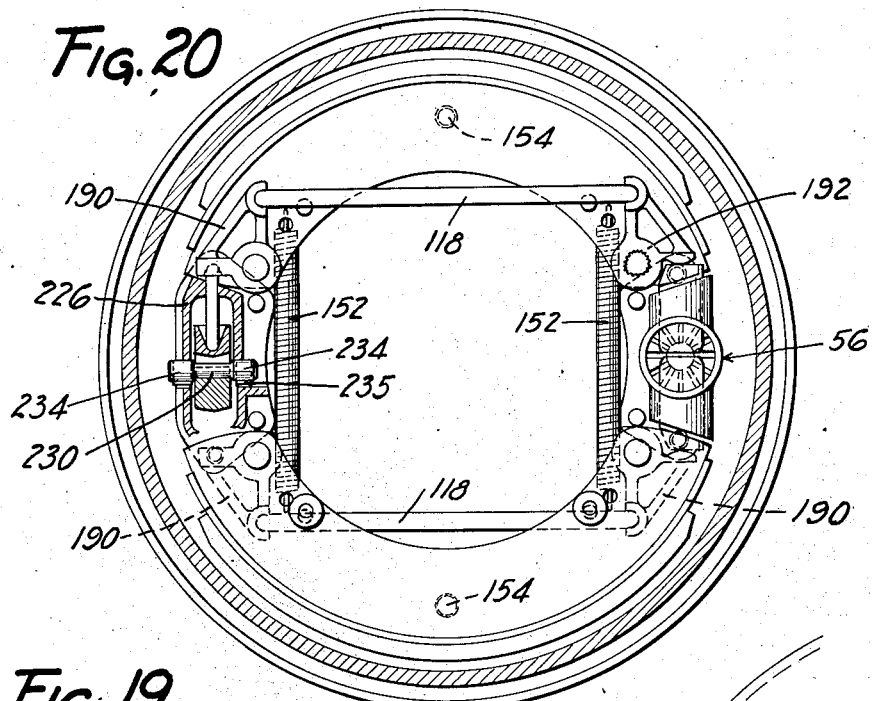
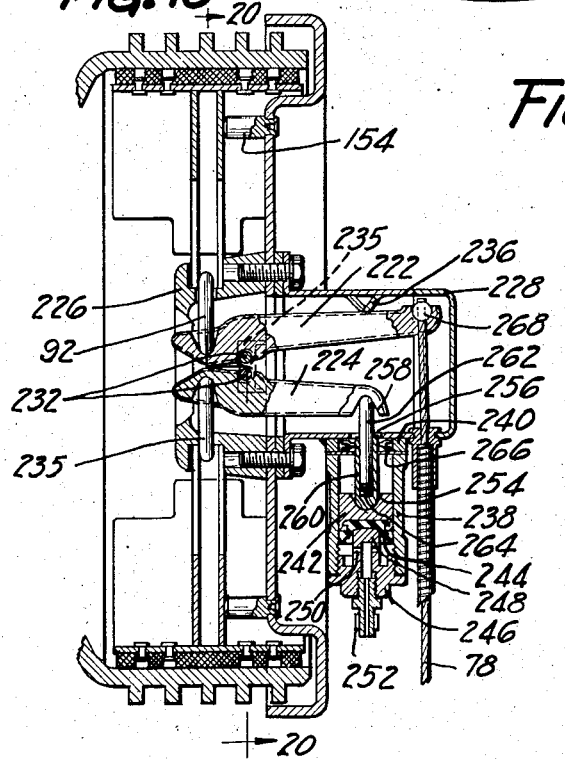
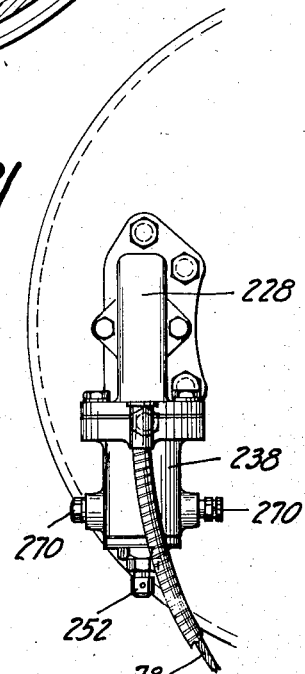
INVENTOR
JEAN FRANCOIS
BY
M. W. McConkey Patented Mar. 27, 1945

2,372,319

UNITED STATES PATENT OFFICE 2,372,319

BRAKE

Jean François, Issoire, France, assignor to Bendix Aviation Corporation, New York, N. Y.

Application January 10, 1942, Serial No. 426,350
In France March 28, 1941

6 Claims. (Cl. 188—78)

The present invention relates to brake controls for vehicles, advantageously applicable to the operation of brakes comprising a pair of brake shoes pivotally mounted on the backing plate or displaceable to a certain extent with respect to said backing plate and which, depending upon the direction of drum rotation, take support either on one or the other of two fixed point elements.

The control device constituting the object of the invention, acts according to the principle of a floating control which follows the shoes in their displacement and the action of which is unaffected by unequal wear of the linings of the respective shoes.

In conformity with a characteristic of the invention, the control device is constituted by a set of levers connected together by a floating articulation, which act upon the shoes in such manner that the braking effort applied by a lever to one shoe creates a reaction which applies the other shoe.

Another characteristic of the invention consists in that the control device is constituted by a set of two levers articulated together at one of their extremities, whilst the other extremity of one of these levers is mounted pivotally on the backing plate and the other extremity of the second lever is actuated by a mechanical actuator, for example by brake cable. The two levers take support on or abut the respective shoes at points disposed between the extremities of each lever.

In conformity with another characteristic of the invention, the levers take support or abut at one of their extremities on the respective shoes while the opposite extremity of one of these levers is pivotally mounted on the backing plate and the mobile extremity of the other lever is connected to a push rod which is preferably parallel to this backing plate, the levers being connected one to the other by a floating articulation disposed between the respective extremities of each lever.

A further characteristic of the invention consists in that the set of levers, connected one to the other by a floating articulation, may be actuated through the intermediary of two independent controls which may comprise on the one hand, a control actuated by fluid pressure, and on the other hand, a mechanical control. The mechanism may be so arranged that when the mechanical control is actuated, the set of levers is articulated on an element that forms a part of the fluid pressure actuated control.

The invention consists likewise in that a rocking element pivoted on one shoe and which forms part of the control mechanism of this shoe, is mounted on an eccentric stub shaft comprising splines or teeth which engage in corresponding grooves provided on the rocking element, with the result that through an appropriate disposal of the rocking element on its axis, an adjustment of the control device is obtained.

The levers constituting part of the control mechanism may be disposed in a plane parallel or perpendicular to the backing plate, or in a plane which forms an angle to the plane of the backing plate.

Other characteristics and advantages of the invention will appear from the following description and the annexed drawings, in which:

Figure 4 is a brake in elevation provided with a control device similar to that shown in Figures 1 and 2;

Figure 5 is a section at 5—5 of the brake of Figure 4;

Figure 6 is a section at 6—6 of the brake of Figure 4 showing a housing in which the push members actuated by the control mechanism are disposed;

Figure 7 is a section at 7—7 of Figure 4 showing in detail one of the rocking levers forming part of the control mechanism;

Figure 8 is a section at 8—8 of Figure 4 showing another rocking lever provided with a device that permits adjustment of the position of this lever;

Figure 9 is a section at 9—9 of Figure 4 showing the articulation of the control device on the backing plate and the cable hitched to this control;

Figure 11 is a section at 11—11 of Figure 10 showing details of the control mechanism;

Figure 12 is a partial section at 12—12 of Figure 10 showing one of the rocking members forming part of the control mechanism utilized in this modification;

Figure 13 is a partial section at 13—13 of Figure 10 showing an adjustable rocking member forming part of the control mechanism used in this modification;

Figure 15 is section at 15—15 of Figure 10 showing details of the adjusting device;

Figure 19 shows a control device forming part of the invention combined with a hydraulic control;

Figure 20 is a section at 20—20 of the Figure 19 showing in elevation the brake represented on this figure;

Figure 21 is a rear view of the brake shown on Figure 19.

Figure 1:
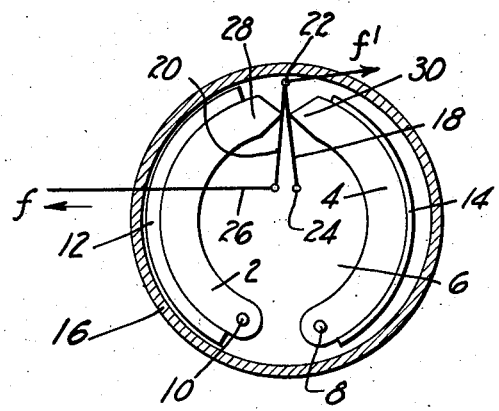
Figure 1 is a schematic representation of one form of the control shown in rest position.
Figure 2:
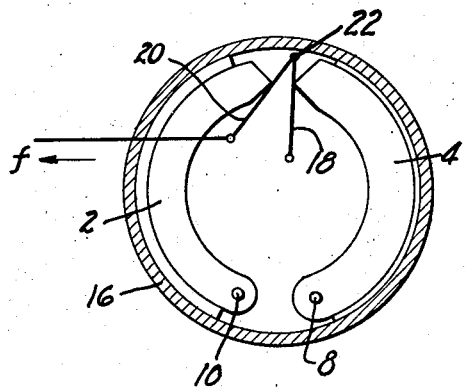
Figure 2 is a view similar to that shown at Figure 1 and shows the control in operation position.

In the embodiment shown on Figures 1 and 2, the shoes 2 and 4 are pivotally mounted on the backing plate 6 by means of pivots 8 and 10 fixed on the latter. The shoes are provided with friction linings 12 and 14 which in the embodiment shown on the drawings have unequal thickness, to demonstrate the principle of the floating cam inherent to the control device forming the object of the invention. The shoes co-operate with a rotating drum 16 adapted to be fixed to the respective wheels of the vehicle. The shoes are actuated by a control device constituted by two levers 18, 20, the external extremities of which are connected one to the other by means of a floating articulation 22. The internal extremity of the lever 18 is articulated on the backing plate by means of a pivot 24 carried by the latter, while the internal extremity of the lever 20 may be connected to a traction cable 26 shown parallel to the backing plate.

When the cable is pulled in the direction of the arrow $f$, it draws the nose 28 of the shoe 2 towards its brake drum. When the shoe is applied against the drum, a reaction to displacement of the lever 20 is created and the nose 28 becomes the pivot point of lever 20 which rocks clockwise. The floating connection 22 is displaced as a result in the sense of the arrow $f'$ which causes pivoting of lever 18 on the axis of articulation 24 and subsequently the displacement towards the drum of the nose 30 of the shoe 4, the latter, in its turn being thus applied against the drum.

Although in the embodiment shown on Figure 1, the lining shown on the shoe 4 may be worn to a greater extent than the lining of shoe 2, the arrangement of two levers, articulated on the pivot 24, deforms with the result that the effort applied to the respective shoes is in the same ratio as the ratio of the lever arms, which in practice, remain substantially the same.

It results from what precedes that the control device follows the shoes in their displacement at the same time insuring a correct distribution of the effort which acts upon the respective shoes. Due to the fact that the relation of the lever arms which act on the shoes remains substantially the same, the effort exercised by the levers 18, 20 on each shoe, has substantially the same value. It will be noticed that the lever 20 acts on the shoe at a point situated between the lever extremities and that by an appropriate choice of the attaching point of the cable to the lever, one may vary the mechanical advantage of the effort transmitted by the cable.

Figure 3:
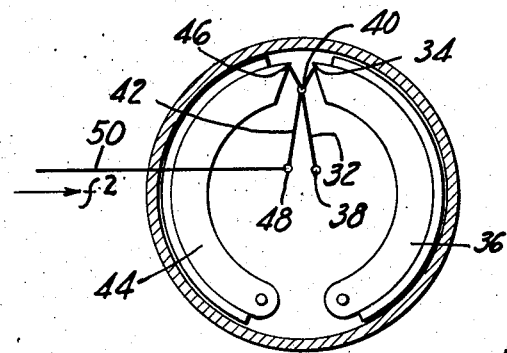
Figure 3 is a schematic representation of another modification of the control.

In the modification shown on Figure 3, the lever 32 takes support or abuts at 34 at one of its extremities on the shoe 36, while the opposite extremity of this lever is pivoted at 38 on the backing plate. The lever 32 is connected intermediate its extremities by means of a floating articulation 40 to lever 42 at a point situated between the two extremities of the latter lever. One extremity of the lever 42 takes support or abuts on the shoe 44 at 46 while the opposite extremity of this lever is hitched at 48 to a brake rod 50 shown parallel to the backing plate. It will be evident that on pushing on the movable extremity 48 of the lever 42, in the direction of the arrow $f^2$, the force acts through the intermediary of the articulation 40 on the lever 32 which pivots on the fixed axis 38 and pushes the shoe 36 against the drum through its extremity at 34. This creates a reaction tending to immobilize the floating connecting point 40 and as a result the lever 42 swings about 40 in a counterclockwise sense and acts at 46 on the shoe 44 pushing this shoe against the drum. From what precedes, it results that the two shoes are thus applied against the drum.

The embodiment shown on Figure 3 compensates lining wear in a manner identical to that described with respect to the embodiments of Figures 1 and 2. The set of levers shown in Figure 3 might likewise be articulated on the backing plate at 48 and in this case the extremity 38 of the lever 32 would be mobile and hitched to a cable that would be pulled in a sense contrary to that indicated by the arrow $f^2$.

Although the sets of levers forming part of the control devices illustrated at Figures 1 and 2 are shown as disposed in a plane parallel to the backing plate, the operation of these devices is not affected when the set of levers are disposed in a plane perpendicular to the backing plate, or in a plane which forms an angle with the plane of the backing plate.

In the embodiment shown in Figures 4 to 9, the control device is applied to a brake in which a pair of shoes 52, 54 take support, either at one extremity or the other depending upon the direction of rotation of the brake drum. The two shoes act as leading shoes, no matter what be the direction of rotation of the drum. Brakes of this type are described in French Patent No. 841,038 of the 22nd of July 1938. When in the brake shown in Figure 4 the drum turns in one direction, one of the shoes transmits the braking reaction to an adjusting device housing designated generally by the ordinal 56, while the reaction of the other shoe is transmitted to a housing in the interior of which is disposed the control device indicated generally by the ordinal 58. When the drum turns in a contrary sense, the situation is reversed.

The control device 58 is constituted by two levers 60—62, which at one of their extremities are connected one to the other by a pivot 64. This pivot engages in rounded depressions provided on each of the levers. The lever 62 is articulated at its opposite extremity through the intermediary of a pin 66 carried on a bracket 68 fixed to the backing plate 70 through rivets 72. The opposite extremity of lever 60 carries a clevis 74 articulated on this lever by means of a pin 76 and attached to a control cable 78. It will be noticed that in this embodiment the levers 60 and 62 displace themselves in a plane parallel to the backing plate 70. The extremity of lever 60 on which is hitched the clevis 74 is oriented so as to improve the exit of the cable from the backing plate.

The levers work within a rectangular slot provided in a cylindrical housing 82 fixed in any appropriate manner on the backing plate. In the embodiment shown in the drawings, a housing 82 is provided with a fixture 84 having the form of a regularly shaped quadrilateral with rounded corners, and which is fixed to the backing plate through the intermediary of screws 86. The fixture carries a circular abutment 88 which engages the backing plate. Formed on the levers 60 and 62 are profiled noses 90 which act on push members 92 lodged in a cylindrical compartment provided in the housing. These push members present at one extremity a slot 94 in which engages the web of one of the shoes and at the other extremity a slot 96 in which engage the levers 60 and 62. On each of the push members 92 is mounted a sleeve 98 having fixed thereto an abutting element 100 inserted in the slit 94 and which presents an inclined plane on which abuts the web of the shoe. The sleeves 98 are immobilized in place by means of screws 86 the ends of which engage against the external edges of the sleeves. The push members 92 act on the shoes through the intermediary of rocking members 102 having fixed axes of articulation and adjustable rocking members 104 which, in this embodiment, are mounted in pairs on the opposite sides of the respective shoe webs.

As shown on Figures 7 and 8, the rocking members 102 are pivoted on the shoe through the intermediary of the stub shaft 106 provided with a circular central flanged bearing collar 108 which is rotatably mounted in an appropriate opening provided in the web of the shoe. The stub shaft 106 presents at its extremities two heads 110 and the rocking members, on assemblage, are inserted onto this stub shaft through the intermediary of eyes 112, the said shaft being normally lodged in the reduced portion of the eyes. The rocking members 102 present a lip 114 which takes support on the two external branches provided on the respective push members 92 and which have the slits 94. On these rocking members there is furthermore provided a hook 116 which acts upon the rocking members mounted on the opposite sides of the upper extremity of the web through the intermediary of a link 118. This link may be constituted by two punched parts connected one to the other by means of rivets 124. The web of the shoe 52 engages between the two punched parts which constitute the link 118 which in turn connects together the rocking members disposed at the opposite extremities of the shoe.

The rocking members 104 are adjustable and are mounted on a stub shaft 122 which carries an eccentric 124' lodged in an opening provided in the web of the shoe. This stub shaft further presents journals 126 which turn preferably in rings 128 lodged in the respective rocking members on opposite sides of the shoe web. The ensemble is maintained in place through the intermediary of a washer 130 which abuts on a head 132 provided on the stub shaft 122 and on the other hand by means of a nut 134 mounted on the threaded extremity of this shaft.

It results from what precedes that in unscrewing the nut 134, one may adjust the pivotal axis of the rocking members 104 and subsequently lock the shaft 132 in the desired angular position, and thus by adjusting reduce to a minimum the play in the applying mechanism constituted by the rocking members and the links.

On each shoe of the embodiment shown in Figure 4 are mounted a rocking member 102 having a fixed pivotal axis and a rocking member 104 having an adjustable pivotal axis. These rocking members are of similar construction. The noses 114 of the articulated rocking member on the upper extremities of the shoes engage with the arms of the members 136 forming part of the adjusting device 56. These arms carry slits in which the web of the shoes engage, while the opposite extremity of these members presents a beveled extremity 138. An adjusting screw 140 comprises a conical head 142 provided with arresting teeth 144 in which the beveled extremities 138 engage. On the extremity of the adjusting screw is provided a squared portion 146 and it will be obvious from what has been stated that in actuating this screw by means of an appropriate tool, the arms may be separated one from the other and in this manner the control mechanism for the rocking members is adjusted and also the brake shoes.

The control cable 78 passes through a fitting 148 fixed to the backing plate by means of a screw 150. The shoes are connected one to the other by means of return springs 152 which maintain the shoes, as well as the elements forming part of the control mechanism in rest position. As shown on Figure 4, the levers 60, 62, due to the action of the return springs, are maintained normally in inclined position, in such a way that in the position which corresponds to the mean throw of these levers, the levers are substantially symmetrical with respect to the vertical diameter of the drum. The shoe webs are supported by pins 154 fixed to the backing plate.

When the brake is operated, the traction effort applied to the cable 78 produces a deformation of the system of levers 60, 62 in the manner hereinabove described. The push members 92 are thus pushed towards the exterior with the result that on the one hand the lower extremities of the shoes are disengaged from the element 100 and brought into contact with the drum and furthermore the lower rocking members 102, 104 are caused to oscillate. The links 118 cause to pivot in consequence, the upper rocking members, which take support or abut on the adjusting device and under the effect of the reaction, the upper extremities of the shoes are likewise pushed against the drum.

As a result of the dragging along exerted by the drum, the shoes effectuate a slight floating movement and when the drum turns in a clockwise direction, the lower extremity of the shoe 52 transmits the braking reaction to the element 100 which engages with the housing of the control device, while the upper extremity of the shoe 54 transmits the braking reaction to the housing of the adjusting device. When the drum turns in opposite sense, the situation is reversed and the upper extremity of the shoe 52 transmits its braking reaction to the housing of the adjusting device, while the lower extremity of the shoe 54 transmits the reaction to the housing of the control device. Whatever be the direction of rotation of the drum, the two shoes act as leading shoes and function both one and the other in identical manner.

The leading shoe brake embodiment shown on Figures 10 to 15 is similar to that shown on Figures 4 to 9 with this difference, however, that in the Figures 10-15, the set of levers forming part of the control device is disposed in a plane perpendicular to the backing plate. Furthermore, each shoe comprises two webs or a composite web and the rocking members forming part of the control device are pivoted between the two webs or between the two web parts. In this modification and in that which follows, similar elements carry the same reference numerals.

The control device constituted by two levers 156, 158 passes through a housing 160 fixed on the internal face of the backing plate and over these levers is mounted a casing 162 fixed on the external face of the backing plate, preferably an intermediary member 164 being interposed therebetween. Screws 166 which pass through corresponding openings provided in these members serve to fix the assembly in place. One extremity of the lever 156 is articulated on the casing 162 by means of a pin 168, while the opposite extremity of this lever presents a rounded tenon 170 which engages in a complementary mortise provided in the extremity of lever 158. These levers 156, 158 pass through the housing 160 with sufficient play to permit the articulation 170, 172 which connects these levers, to float freely when the brake is actuated as hereinabove indicated. On the opposite extremity of lever 158 is mounted a clevis 74 to which is hitched a traction cable 78 which passes through a sleeve or fitting 174 provided on the casing and which is connected to the rodding of the vehicle. On the casing 162 is provided an opening 176 closed by a cover 178 maintained in place by means of screws 180. During the assembly, the cover 176 is removed, thus facilitating hooking up of the clevis.

The housing 160 is of strong construction and embodies inclined planes 182 on which the shoes which transmit to the housing the braking reaction, take support or abut. The casing 162 is relatively of light construction, since it merely serves to support the axis of articulation 168.

Levers 156, 158 are constituted by profiled drop forged members which present each a rounded depression 184 in which the extremities of the push member 186 engage. The opposite extremity of these push members projects into a depression 188 provided in the rocking members.

Figure 10:
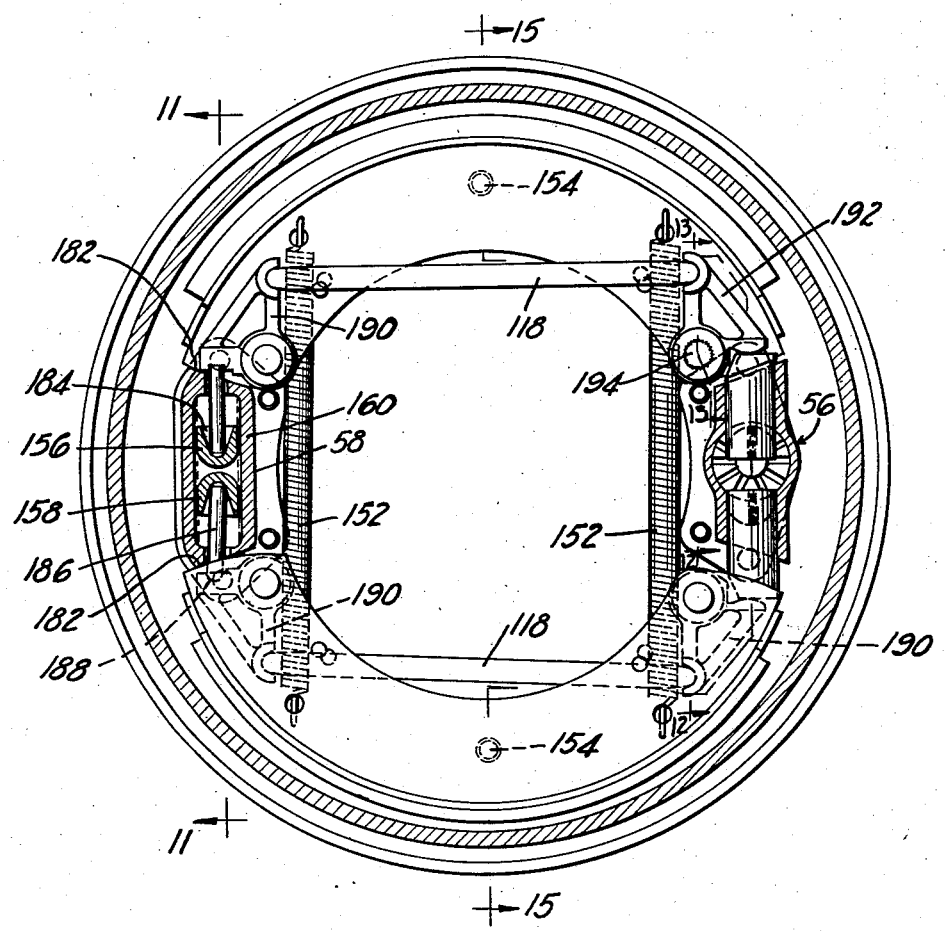
Figure 10 is a brake in elevation provided with a control device similar to the one shown on Figures 1 and 2, but disposed in a plane perpendicular to the backing plate.
Figure 14:
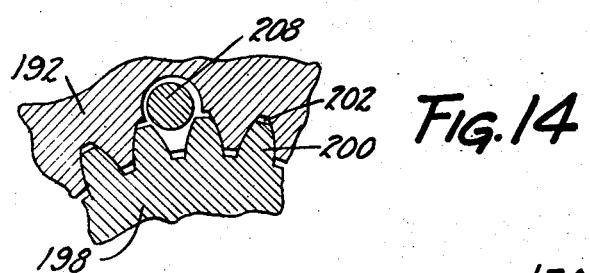
Figure 14 is a large scale view of a portion of Figure 13 showing the positioning of the rocking element by means of splines or teeth.

The embodiment shown on Figure 10 comprises on the one hand rocking members 190 having a fixed stub shaft articulation, and a rocking member 192 having an adjustable stub shaft articulation 194 (Figure 13). The external journals 196 of the stub shaft 194 may be advantageously eccentric with respect to the central portion of this stub shaft. The central portion 198 is provided with grooves or splines and may be further provided as shown in Figure 14 with teeth 200 which engage in complementary depressions 202 provided in the rocking member 192. The journals 196 are rotatably disposed in concentric rings 204 lodged in openings provided in the webs, these openings having a diameter sufficient to permit passage of the grooved central portion. The rings are held in place by means of cotter pins 206.

The adjustment mentioned serves as factory adjustment. In order to preclude subsequent non desirable adjustments, one may, as shown on Figure 14, insert a pin 208 parallel to the grooves or teeth 200, in order to immobilize the grooved portion 198. The pin 208 may be fixed in place in any desired manner.

This embodiment functions in a manner similar to that described hereinabove. The same is true with respect to the adjusting screw 140, half of which is shown in Figure 15 in a position which corresponds to new lining, whilst the other half corresponds to the end of the stroke of the screw, when the linings are completely worn, the screw being at that time stopped by the collar provided on its external extremity.

Figure 17:
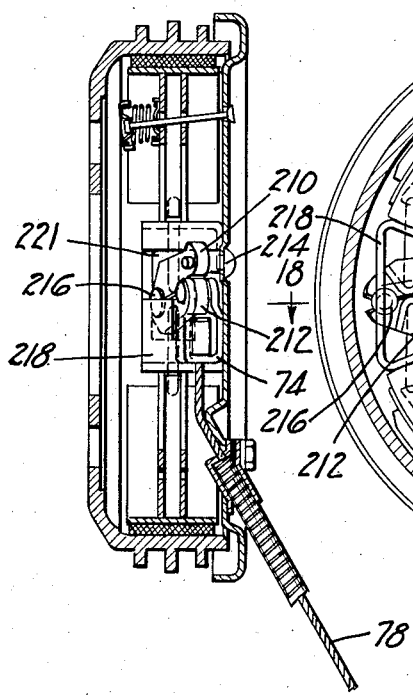
Figure 17 is a section at 17—17 of the brake shown in Figure 16 and shows the disposition of the set of levers forming part of the control device.
Figure 16:
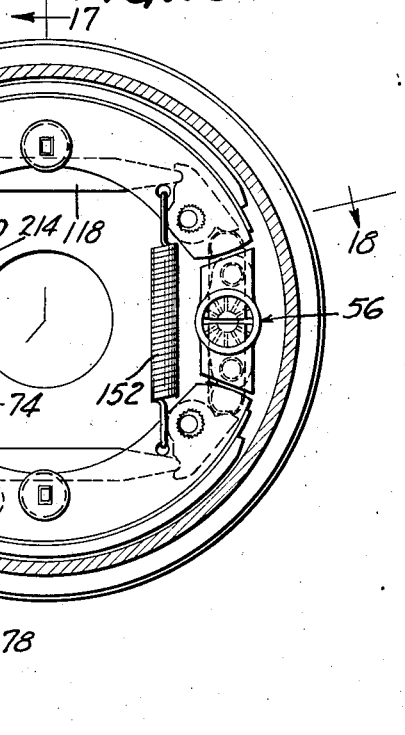
Figure 16 shows another brake modification in which the set of levers forming part of the control device is disposed in an inclined plane with respect to the plane of the backing plate.
Figure 18:
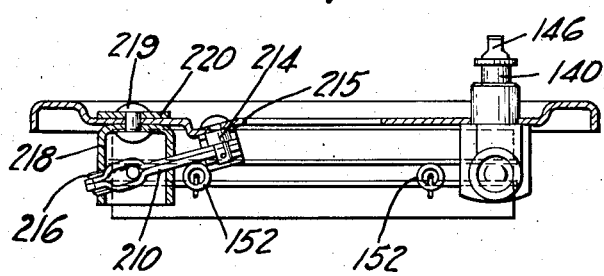
Figure 18 is a section at 18—18 of the brake of Figure 16.

The embodiment shown on Figures 16, 17 and 18 is identical to that shown on Figures 10 and 11, with this difference, however, that the set of levers 210, 212 forming part of the control device is mounted in an inclined plane with respect to the plane of the backing plate. The lever 210 is articulated by means of a pin 214 on an inclined plane constituted by stamping 215 mounted on the backing plate. The lever 210 is connected to lever 212 by means of a pin 216 which, as indicated hereinabove, operates as floating articulation. On the lever 212 is mounted a clevis 74 which is hitched to a cable 78 connected to the rodding. This construction presents an advantage in that it brings the hitching place of the cable closer to the lever and thus facilitates the exit of the cable through the backing plate.

The levers 210, 212 are disposed on the bias in a housing 218 fixed on the backing plate by means of rivets 219, preferably a reinforcing plate 220 being interposed. The inclined levers 210, 212 pass with appropriate play through an opening 221 provided in the housing in such a way that the ensemble of levers may deform freely on operation of the brakes, and so that the axis of articulation 216 which connects the levers may float freely. In this embodiment, likewise, the control device acts through the intermediary of rocking members on a pair of shoes which, depending on the direction of drum rotation, transmit each, the braking reaction, either by one of their extremities or by the opposite extremity, to one of the inclined planes provided on the housing 218 or to an adjusting device 56 identical to that described hereinabove.

On the Figures 19, 20 and 21 is shown an embodiment which comprises application of an hydraulic control for the operation of the set of levers described hereinabove. These levers may be actuated either hydraulically or mechanically, that is to say by means of two independent controls.

In this embodiment, the hydraulic control is applied to a set of levers similar to that shown in Figure 3, but disposed in a plane perpendicular to the backing plate. The levers 222, 224 are lodged in an internal housing 226 similar to the housing 160 shown on Figure 11 and an external casing 228 similar to the casing 162 is mounted over these levers. The internal face of each lever is provided with a depression 230 and in this depression are mounted pins 232 having circular heads 234 which are in contact one with the other. As shown on Figure 20, heads 234 pass through a rectangular opening 235 provided in the housing, the opening 235 having a length sufficient to permit the pins 232 which constitute a floating connection between the levers to float freely when the brakes are operated. On the housing 228 is provided a rib 236 which serves as point of articulation for the set of levers, when the levers are operated by a cylinder 238 described more in detail hereinafter.

The cylinder is fixed in an appropriate manner on the casing 228 through the interposition of an intermediary member 240, for example.

Within the cylinder is disposed a piston 242 on which is applied a sealing cup 244. The cylinder 238 is closed by an end member 246 providing a hollow concentric cylindrical part 248 provided with openings 250. The cylindrical part 248 communicates with a fitting 252 which serves to carry liquid under pressure into the cylinder.

On the external face of the piston 242 is formed a spherical depression 254, in which engages one extremity of a push member which passes through an opening 256 provided in the casing 228 and abuts at its other extremity on the bottom of the spherical depression 258 provided in the extremity of the lever 224. This push member is constituted by a tubular element 260, in which a rod 262 engages. The length of this push member is adjusted by the interposition of washers 264. A flexible protecting washer 266, for example of rubber, is inserted on the push member, in order to prevent the entry of foreign matter into the cylinder. The edge of this washer may be V-formed as shown on Figure 19.

When the cylinder 238 is actuated, the set of levers 222, 224 pivots on the rib 236 serving as fulcrum point. As indicated with respect to the embodiment shown on Figure 3, under the effect of the reaction, the assembly of levers deforms and acts on the shoes through the intermediary of push members 92 and rocking members 190, 192. As hereinabove stated, the braking reaction is absorbed on the one hand by the housing 226 and on the other hand by the adjusting mechanism. In this embodiment as in those described hereinabove, the faces of the housing which absorb alternatively the braking reaction may present an inclined plane against which the respective shoe is urged due to the dragging along effect exercised by the drum when the brakes are actuated.

The lever 222 is longer than the lever 224 and presents at its longest extremity a spherical depression in which is mounted a ball 268 fixed to a cable 78 disposed in a sheath abutting on the casing 228. The axis of the sheath is shown parallel to the axis of the cylinder.

When the mechanical control is actuated through traction on the cable 78, the assembly of levers 222, 224 pivots on the push members 260, 262 which abut against the piston 242. This piston normally engages in turn with the hollow cylindrical part 248 provided on the end member 246. Although in Figure 19 the piston 242 is shown as abutting on the cylindrical part 248 through the intermediary of the sealing cup 244, it will be obvious that if it is so desired, utilization may be made of an annular sealing cup formed so as to uncover the central portion of the piston, which in this case would abut directly against the cylindrical part 248.

The cylinder 238 is provided with bleed valves 270 disposed on opposite sides of the cylinder and consequently the cylinder may be disposed in desired position on the backing plate.

The control device forming the object of the invention may be applied to any type of brake for example, to a brake comprising a pair of shoes pivoted on the backing plate, to a self energizing brake, in which the action of one shoe is added to that of the other, or to a brake comprising a pair of leading shoes which act independently one from the other. The rocking members which may form part of the control mechanism of a leading shoe brake, are either mounted pivotally in pairs on opposite sides of the shoe web or a single rocking member may be inserted between two webs provided on the shoe. Other modes of realisation will be apparent to one skilled in the art without departing from the scope of the present invention.

What I claim is:

1. For a brake having a backing plate and a pair of shoes, applying means for spreading the shoes comprising a lever pivoted on the backing plate and having a thrust applying connection with one of the shoes, a second lever articulated to the first by a floating joint and having a thrust applying connection with the other shoe, and means for exerting a force on said levers comprising a cylinder which acts on one of the levers and causes said lever to pivot on the second lever, and an independent control which acts on the other lever to cause both said levers to pivot on said cylinder.

2. For a brake having a backing plate and a plurality of shoes, an internal and external housing fixed to the backing plate, applying means for spreading the shoes positioned partly within the internal housing and partly within the external housing, said applying means comprising a lever pivoted on the backing plate and having a thrust applying connection with one of the shoes, a second lever articulated to the first by a floating joint and having a thrust applying connection with the other shoe, and means for actuating both of said levers comprising a cylinder which acts on one of the levers to pivot same on the second lever, and an independent control which acts on the other and causes the assembly of levers to pivot on the cylinder.

3. A brake comprising a drum, a backing plate, a plurality of shoes mounted on said backing plate and adapted at times to engage said drum and applying means for said shoe comprising a plurality of levers, articulated at a point between their ends, their corresponding ends being in engagement with the ends of said shoes, mechanical means for applying a force to the other end of one of said levers, and hydraulic means for applying a force to the corresponding end of the other of said levers.

4. The invention as defined in claim 3 wherein the hydraulic means serves as a pivot point for one of said levers upon actuation of the mechanical means.

5. A brake comprising a drum, a backing plate, a pair of shoes mounted on said backing plate for engagement with the drum, applying means for said shoes comprising a pair of levers pivotable in a plane normal to the backing plate, one of said levers being pivoted on the backing plate and having a thrust applying connection with one of the shoes, the second lever being articulated to the first by a floating joint and having a thrust applying connection with the other shoe, means for operating said levers comprising a mechanical actuator connected to the first of said levers and a hydraulic actuator connected to the second of said levers.

6. In the invention as defined in claim 5 wherein the mechanical actuator operates upon the extremity of one lever and the hydraulic actuator operates upon the extremity of the second lever.

JEAN FRANÇOIS.